United States Patent [19]
Thusoo

[11] Patent Number: 5,822,602
[45] Date of Patent: Oct. 13, 1998

[54] PIPELINED PROCESSOR FOR EXECUTING REPEATED STRING INSTRUCTIONS BY HALTING DISPATCH AFTER COMPARISION TO PIPELINE CAPACITY

[75] Inventor: Shalesh Thusoo, Milpitas, Calif.

[73] Assignee: S3 Incorporated, Santa Clara, Calif.

[21] Appl. No.: 685,141

[22] Filed: Jul. 23, 1996

[51] Int. Cl.$^6$ .................................................. G06F 9/38
[52] U.S. Cl. .................................... 395/800.01; 395/588
[58] Field of Search .................. 395/800.01, 800.283, 395/800.32, 376, 381, 384, 392, 561, 588

[56] References Cited

U.S. PATENT DOCUMENTS

| | | | |
|---|---|---|---|
| 4,882,701 | 11/1989 | Ishii | 364/900 |
| 5,056,004 | 10/1991 | Ohde et al. | 264/200 |
| 5,101,484 | 3/1992 | Kohn | 395/375 |
| 5,265,253 | 11/1993 | Yamada | 395/700 |
| 5,303,355 | 4/1994 | Gergen et al. | 395/375 |
| 5,404,473 | 4/1995 | Papworth et al. | 395/375 |
| 5,469,551 | 11/1995 | Sites et al. | 395/375 |
| 5,579,493 | 11/1996 | Kiuchi et al. | 395/383 |
| 5,611,062 | 3/1997 | Webb et al. | 395/376 |
| 5,619,715 | 4/1997 | Dinkjian et al. | 395/898 |
| 5,664,215 | 9/1997 | Burgess et al. | 395/800.23 |
| 5,692,146 | 11/1997 | Yamamoto et al. | 711/200 |
| 5,727,194 | 3/1998 | Shridhar et al. | 395/588 |
| 5,748,934 | 5/1998 | Lesartre et al. | 395/392 |
| 5,752,015 | 5/1998 | Henry et al. | 395/588 |

*Primary Examiner*—Alpesh M. Shah
*Attorney, Agent, or Firm*—Fenwick & West LLP

[57] ABSTRACT

A pipelined processor is modified to efficiently process repeated string instructions. A repeated string instruction repeats an iteration a number of times determined by a counter variable stored in a register file. Each iteration includes at least three pipeline flows to perform a load, store, or compare of a character in the string, and to decrement the counter variable. When the last flow of an iteration reaches the execute stage near the end of the pipeline, the current value of the counter variable is compared to the maximum number of iterations which may be present in the pipeline at one time. When the counter variable is equal to the maximum number of iterations, the execute stage signals the decode stage to stop dispatching iterations. The iterations in the pipeline are completed, providing the proper number of iterations. For short strings, the counter value may be less than the maximum number of iterations, and this is signaled to the decode stage, which flushes the pipeline once the current iteration completes. The decode stage does not need a copy of the counter variable, reducing dedicated hardware for processing repeated string instructions.

13 Claims, 5 Drawing Sheets

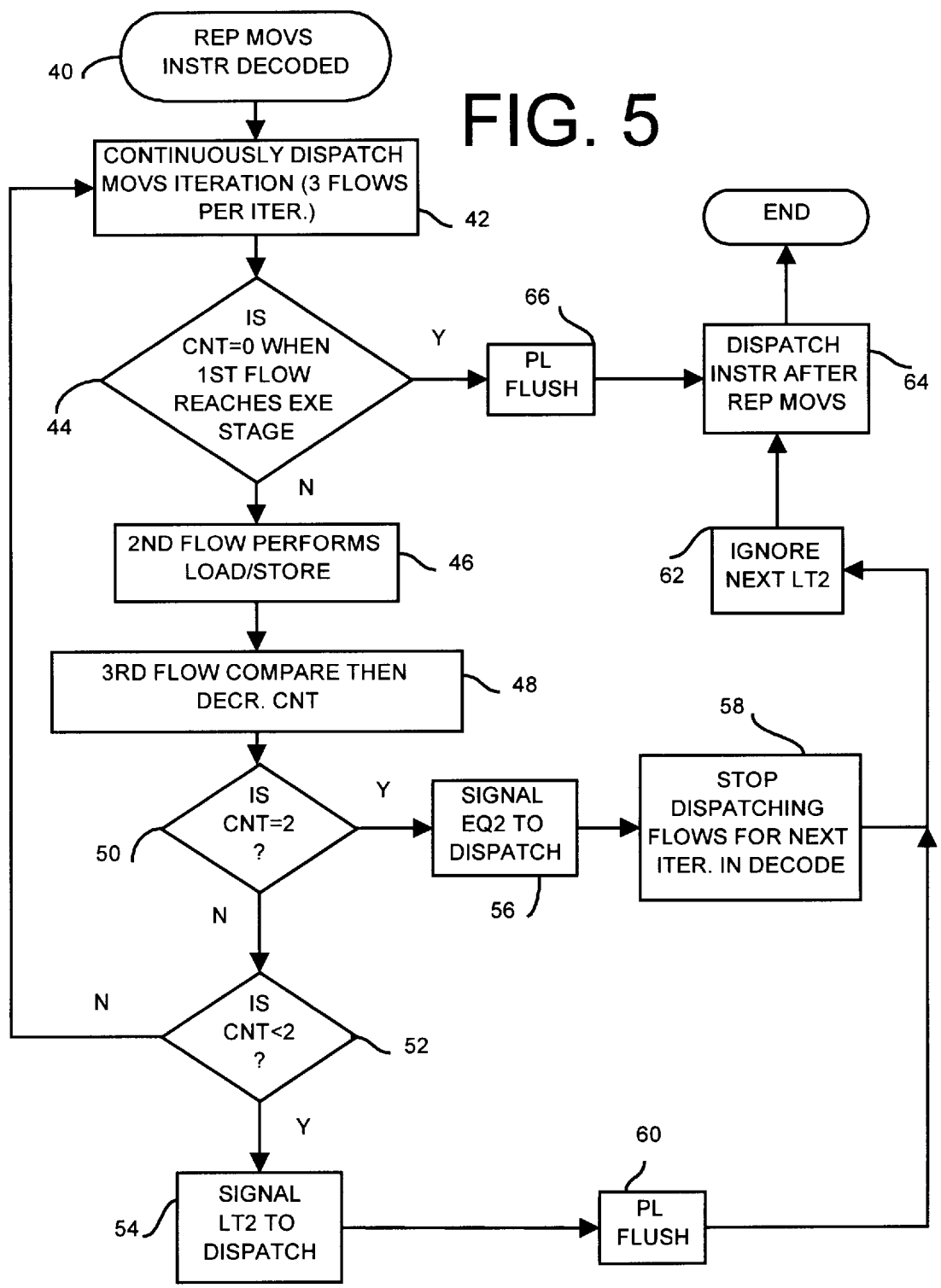

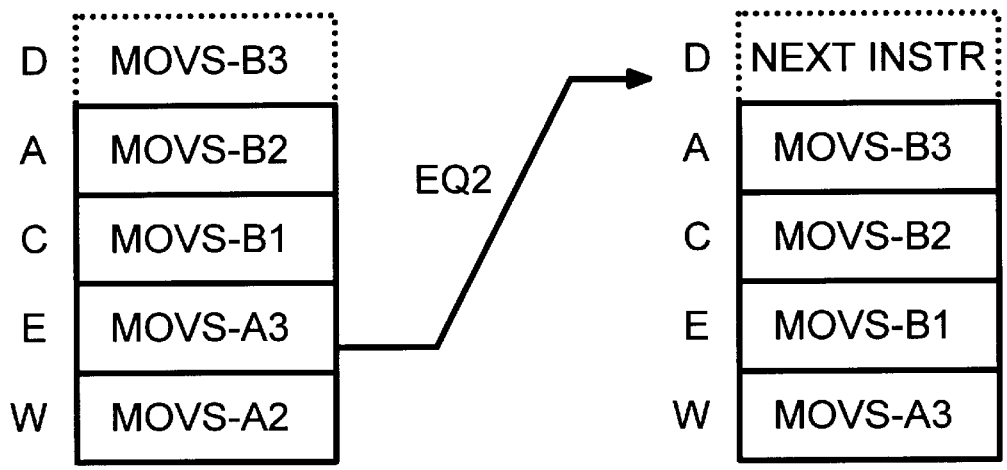
FIG. 6    INIT CNT => 2
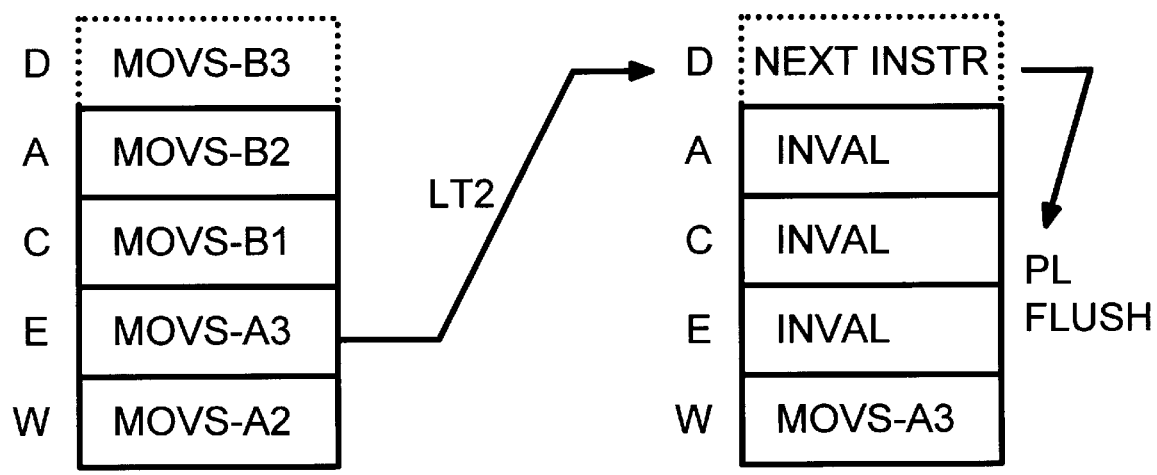
FIG. 7    INIT CNT=1

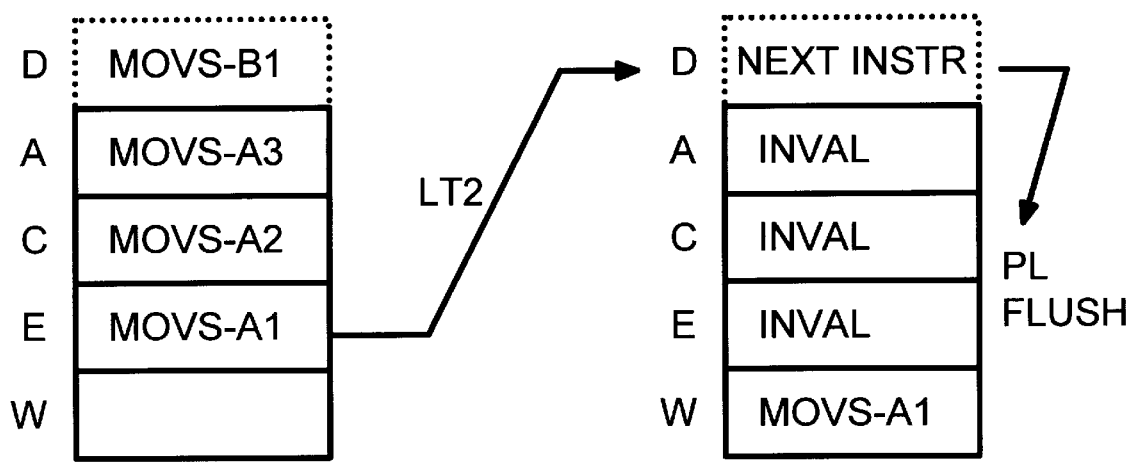
FIG. 8  INIT CNT=0
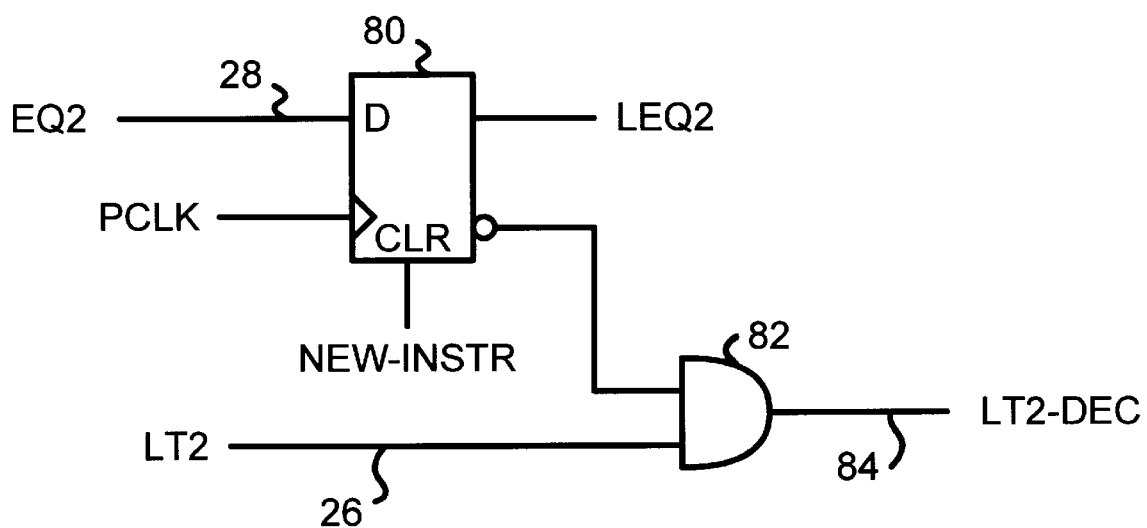
FIG. 9

PIPELINED PROCESSOR FOR EXECUTING REPEATED STRING INSTRUCTIONS BY HALTING DISPATCH AFTER COMPARISION TO PIPELINE CAPACITY

BACKGROUND OF THE INVENTION

1. Field of the Invention

This invention relates to pipelined computer systems, and more particularly for methods to process repeated string instructions.

2. Description of the Related Art

Pipelined microprocessors are widely used in today's computer systems such as personal computers (PC's). A pipeline is a series of pipestages or stages which each perform a portion of an instruction. For example, an instruction is initially fetched from a memory by a fetch stage, then decoded in a decode stage. Operands are fetched in a cache stage and an operation such as an arithmetic or logical operation is performed in an execute stage. Finally the results of the execution are written or stored in a write-back stage. Performance is increased because each stage may contain a separate instruction. Thus multiple instructions are being processed at a time.

While these pipelined processors are effective in increasing performance for simpler instructions such as those in a reduced instruction set computer (RISC) instruction set, more complex instructions such as those of a complex instruction set computer (CISC) instruction set are more problematic. Often these complex instructions require multiple stages of the pipeline, reducing the number of different instructions which may be processed at one time. Some instructions may require flushing the pipeline, delaying the start of the following instruction.

One approach to processing complex instructions has been to add additional hardware to process some of the more complex instructions. However, this added hardware may only be useful for one specific type of instruction, being left idle for much of the time. Since many of the more complex instructions are infrequently executed, adding hardware for the less frequently executed instructions may not be economical. Some more modern compilers do not use these instructions as programming practices change.

One particularly complex type of instruction is the string move instruction. This type of operation is sometimes known as the repeated move instruction since a move instruction is repeated over many iterations as the long string is moved one element or character at a time. The repeated move instruction may take many forms, such as a load (read) from memory or a store (write) to memory from the processor's registers. Compares may also be performed to search for a particular sub-string within the string.

The size and number of characters within the string may vary, depending upon the data being stored and the nature of the data structure (variable strings or fixed arrays). Often the entire string is moved and the length of the string is known. In this case the number of iterations is known to be the length of the string divided by the element size. A count variable is loaded into a register and then multiple iterations of the load or store are sent down the pipeline. As each iteration is processed, the count variable is decremented and tested. Once the count reaches zero, the iterations stop and the next instruction is processed.

Other string instructions do not have a fixed number of iterations. A compare string instruction may exit early once a matching character is found in the string. A flag is typically set for each iteration's compare, and then the flag is tested to determine if more iterations are required.

String Assist Hardware—FIG. 1

FIG. 1 is a diagram of a pipelined processor with additional dedicated hardware to process string instructions. A pipeline begins with decode stage 10 which decodes a fetched instruction. Decode stage 10 dispatches decoded instructions to successive stages until execute stage 16 is reached. Finally write-back stage 18 writes the execution result to register file 20.

For the x86 CISC instruction set, the count variable for string instructions is loaded into the ecx register in register file 20. When a string instruction is decoded, a predetermined number of iterations are dispatched by decode stage 10 before the count variable is known to decode stage 10. The count value in the ecx register is eventually copied to a special register loop counter 22 (LOOP_CNT) in the decode stage. The decode stage then reads the count variable from ecx and determines the remaining number of iterations to dispatch.

It is possible that the desired number of iterations is less than the initial number of iterations dispatched. For the excess iterations dispatched, comparator 12 in execute stage 16 determines that the count value from the ecx register is zero and converts the iteration to a no-operation (nop) using converter 14. Thus the excess iterations are skipped.

The prior-art of FIG. 1 is similar to that disclosed by Papworth et al. in U.S. Pat. No. 5,404,473 assigned to Intel Corporation of Santa Clara Calif. This prior art suffers from having additional hardware for executing string instructions, such as loop counter 22 in the decode stage. Since the decode stage is often somewhat removed from the register file, a path is needed from register file 20 to decode stage 10 to copy the count variable from the ecx register to the loop counter in the decode stage.

The prior art also requires that converter 14 be added to execute stage 16 to covert excess iterations to no-operations since the number of iterations initially dispatched may have exceeded the number of iterations required by the count variable.

What is desired is a method for processing string instructions in a pipelined processor which requires a minimum of added hardware. It is desired to use existing pipeline resources with minimal added resources for processing repeated string instructions.

SUMMARY OF THE INVENTION

A pipelined processor processes a repeated string instruction. The pipelined processor has a plurality of pipeline stages which process instructions. The plurality of pipeline stages receives decoded instructions from a decode stage which dispatches pipeline flows into the pipeline stages. The plurality of pipeline stages has a pipeline capacity. The pipeline capacity is a maximum number of iterations of a repeated string instruction capable of is present in the plurality of pipeline stages.

A register file contains general-purpose registers. A register in the general-purpose registers is designated as an iteration counter for indicating a remaining number or iterations to perform for the repeated string instruction. A compare means in the plurality of pipeline stages compares the iteration counter to the pipeline capacity and activates a halt signal to the decode stage when the iteration counter has a value equal to the pipeline capacity. Iteration means in the decode stage receives the halt signal from the compare means. It halts dispatching of iterations of the repeated string instruction and dispatches a following instruction after the repeated string instruction in response to the halt signal but continues to dispatch iterations of the repeated string instruction when the halt signal is not received.

Thus dispatching of iterations of the repeated string instruction is halted when the iteration counter is equal to the pipeline capacity of iterations. In further aspects of the invention a decrement means in the plurality of pipeline stages adjusts the value of the iteration counter as an iteration is processed. The following instruction after the repeated string instruction is dispatched by the decode stage before the iteration counter reaches zero. Thus processing of the following instruction begins while the repeated string instruction is being processed.

In still further aspects of the invention a second compare means is in the plurality of pipeline stages. It compares the iteration counter to the pipeline capacity and activates a flush-request signal when the iteration counter has a value less than the pipeline capacity. A flush means receives the flush-request signal. It halts dispatching of additional iterations and invalidates pipeline stages in response to the flush-request signal. A blocking means is coupled to the flush-request signal. It prevents activation of the flush-request signal after the halt signal has been generated. Thus a pipeline flush occurs when the iteration counter has a value less than the pipeline capacity before the halt signal is activated.

BRIEF DESCRIPTION OF THE DRAWINGS

FIG. 5 is a flowchart of processing of a repeat string move instruction using comparison to the maximum number of iterations in the pipeline.

FIG. 6 is an example of a pipeline processing a repeat string move instruction with an initial counter variable of two or more.

FIG. 7 is an example of a pipeline processing a repeat string move instruction with an initial counter variable of one.

FIG. 8 highlights a pipeline processing a repeat string move instruction with an initial counter variable of zero.

FIG. 9 is a diagram of logic in the decode stage which blocks the next LT2 signal which follows the EQ2 signal.

DETAILED DESCRIPTION

The present invention relates to an improvement in pipelined processors. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 2:
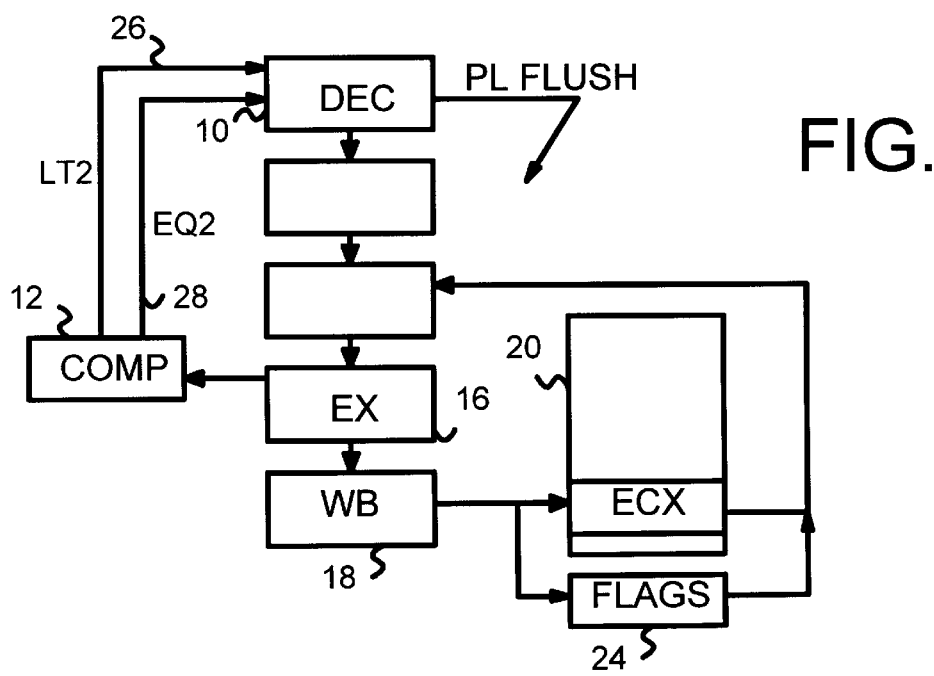
FIG. 2 is a diagram of a pipelined processor with a minor modification for efficiently processing string instructions.

FIG. 2 is a diagram of a pipelined processor with a minor modification for efficiently processing string instructions. A pipeline begins with decode stage 10 which decodes a fetched instruction. Decode stage 10 dispatches decoded instructions to successive stages until execute stage 16 is reached. Finally write-back stage 18 writes the execution result to register file 20. Flags 24 are also updated by the execution results.

The count variable is initially loaded into register ecx of register file 20. As each iteration is processed by execution stage 16, the count variable in register ecx is read, decremented, and written back to register file 20. Comparator 12 compares this count variable before being decremented during each iteration and signals EQ2 28 when the count variable is equal to two. Comparator 12 also activates signal LT2 26 when the count variable is less than two.

Under certain circumstances described later, decoder 10 upon receipt of signal LT2 signals a pipeline flush. All instructions in the pipeline are invalidated when a pipeline flush is signaled. Pipeline flushes are often used for exception handling to clear the pipeline of all instructions following an exception or interrupt so that program execution is halted. A service routine is then fetched and processed by the pipeline.

Figure 1:
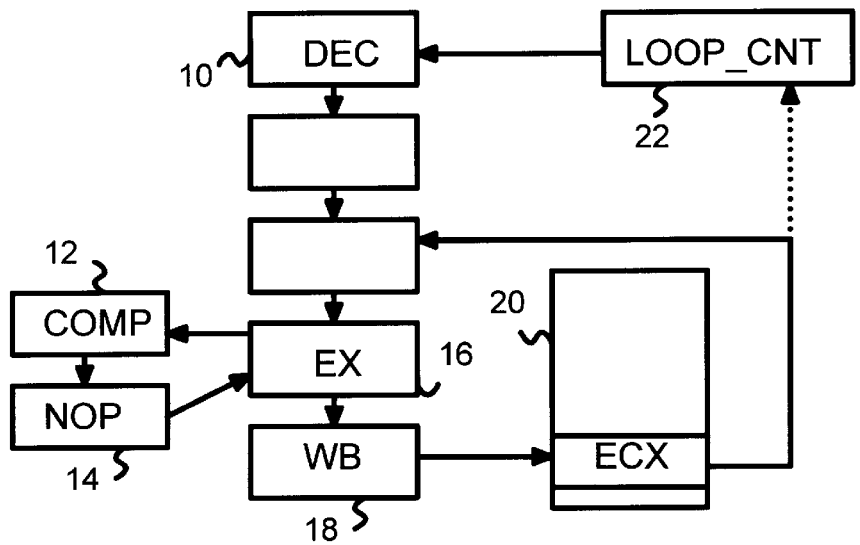
FIG. 1 is a diagram of a pipelined processor with additional dedicated hardware to process string instructions.

Unlike the prior art of FIG. 1, the full count variable is not sent from register file 20 back to decode stage 10. Instead just two signals, LT2 and EQ2, are sent from comparator 12 in execute stage 16 to decode stage 10. Signal LT2 26 and signal EQ2 28 are each single-bit signals while the count variable in register ecx is typically a 32-bit value. Thus only two signal wires rather than 32 signal wires are needed for signaling decode stage 10.

Figure 3:
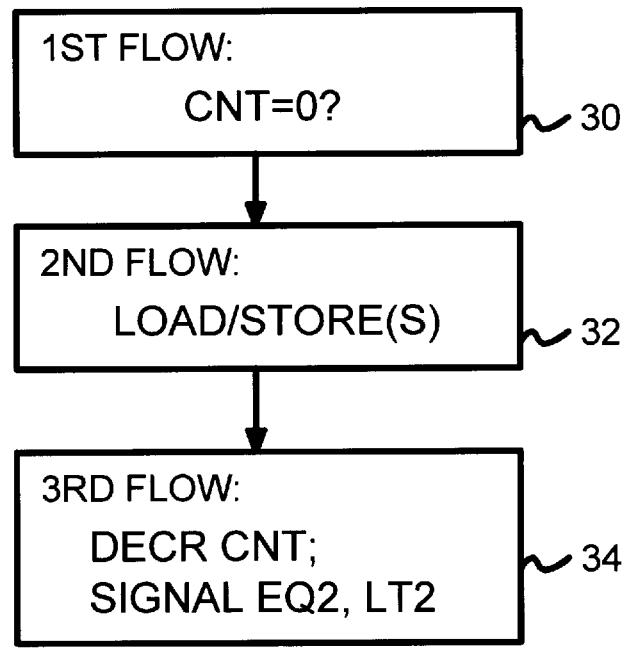
FIG. 3 shows that each iteration of a string move instruction contains three pipeline flows.

Three Pipeline Flows per Iteration—FIG. 3

FIG. 3 shows that each iteration of a string move instruction contains three pipeline flows. Each pipeline flow is a separate operation that can be processed by the various stages of the pipeline. While a more complex pipeline might be able to combine two or all three of these flows together into a single flow, this requires duplicated hardware.

First flow 30 reads the counter variable in register ecx and determines if the terminal value, zero, has been reached. The value zero indicates that no more iterations are required, and the string move instruction is completed.

Second flow 32 performs the load, store, or compare indicated by the decoded repeat string instruction. For string load instructions, a character or element of the string is read from memory to a register in register file 20 of FIG. 2. String store instructions move the contents of a register to memory. String compare instructions read a character from memory and compare it to a character in a register. More complex string memory-move instructions perform a load followed by a store using two or more separate second flows (not shown).

Third flow 34 decrements the counter variable and compares the pre-decremented counter variable to two. When the pre-decremented counter variable is equal to two, signal EQ2 is asserted and sent to the decode stage. When the pre-decremented counter variable is less than two, either one or zero, signal LT2 is asserted to the decode stage.

First flow 30 is dispatched by decode stage 10 of FIG. 2 one processor clock cycle before second flow 32, which is dispatched once clock cycle before third flow 34, when no pipeline stalls occur. Thus when first flow 30 reaches writeback stage 18, second flow 32 is in execute stage 16 and third flow 34 is in the stage before execution stage 16. When more complex string instructions are processed requiring multiple flows for the second flow, then third flow 34 is dispatched up to three additional clock cycles later, after the last of second flows 32 are dispatched.

First flow 30 reads the counter variable in register ecx of register file 20 and compares the counter variable to zero. Should the counter variable be zero, then the iteration must be halted before a load or a store by second flow 32 can occur. A pipeline flush is used to cancel the load or store by second flow 32 and the counter variable update by third flow 34.

Together, first flow 30, second flow 32, and third flow 34 are one iteration. Each iteration operates on one element or character in the string. The iteration of FIG. 3 is repeated some number of times equal to the initial counter variable in register ecx. Thus a repeated string instruction repeats the iteration multiple times by dispatching successive iterations of the three flows.

Count is Compared to Maximum Number of Iterations Possible in Pipeline

Figure 4:
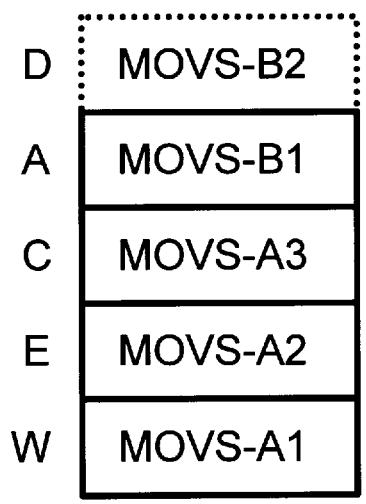
FIG. 4 is a diagram illustrating a pipeline containing no more than two iterations of a string instruction.

FIG. 4 is a diagram illustrating a pipeline containing no more than two iterations of a string instruction. The pipeline contains five stages:

D Decode

A Address Generation

C Cache operand Fetch

E Execute

W Write Back

The decode stage is considered to be the dispatcher to the remainder of the pipeline, which contains the other four stages. When each iteration contains three pipeline flows, then a maximum of one complete iteration and one partial iteration may be present in the pipeline at any time. The first two iterations of a move string instruction MOVS are shown in FIG. 4. Iteration MOVS-A has three flows: first flow MOVS-A1 in the write-back stage, second flow MOVS-A2 in the execute stage, and third flow MOVS-A3 in the C stage. The second iteration, MOVS-B, has only the first flow MOVS-B1 in the A stage. The second flow, MOVS-B2, has not yet been dispatched from the decode stage and is thus not considered to be in the pipeline yet.

As the flows are staged down the pipeline, additional iterations are dispatched and completed. However, at no time are there more than two flows in the four stages of the active pipeline. Thus the maximum number of iterations, partial or whole, in the active pipeline at any time is two. This is the capacity of the pipeline.

Comparator 12 in execute stage 16 of FIG. 2 compares the counter variable to the maximum number of iterations in the active pipeline, two. Longer pipelines may contain additional iterations and comparator 12 must then be modified to compare to the larger maximum number of iterations in the active pipeline after the dispatching stage.

When the counter variable reaches two, then no new iterations need to be dispatched. The two iterations in the pipeline are allowed to complete. As the second iteration in the pipeline completes, the counter variable is decremented to zero, indicating that the string operation has been repeated the desired number of times.

For very short strings, the initial counter variable is less than two. When the initial counter value is zero, then no iterations are required. The initial counter value being zero is detected by the first flow of the first iteration, before the load or store occurs in the second flow. The pipeline is flushed and the string instruction is completed.

When the initial value is one, only one iteration should be performed. Before the decrement by the third flow, the counter variable is less than two, and LT2 is signaled. Since there may be parts of two iterations in the pipeline, one iteration too many is present. The pipeline is flushed after the current iteration reaches the last stage of the pipeline.

Processing of Repeat String Instructions—FIG. 5

FIG. 5 is a flowchart of processing of a repeat string move instruction using comparison to the maximum number of iterations in the pipeline. When a repeat string move instruction is decoded, step 40, then multiple iterations of character-move operations are dispatched, step 42, with three or more pipeline flows per iteration.

When the first flow of each iteration reaches the execute stage, the counter variable from register ecx is read and compared to zero, step 44. A zero is normally only detected when the initial counter value is zero, indicating that no iterations are needed. For other values of the initial counter variable greater than zero, EQ2 is signaled by the third flow before zero is detected by the first flow. The counter decrements and reaches two before zero is reached, thus avoiding a pipeline flush.

A zero detected in step 44 requires pipeline flush 66, since the string move is in the pipeline before the execute stage and after the decode stage. The next instruction following the repeat string move instruction may then be decoded and dispatched, step 64, ending the processing of the repeat string move.

When zero is not detected by step 44, which is the normal case, the second flow next reaches the execute stage. The second flow performs the load or store, step 46, for the current iteration. The third flow next reaches the execute stage, and the counter value is compared and then decremented. The pre-decremented counter variable is used for tests 50, 52. Test 52 compares the pre-decremented counter variable to the maximum number of iterations in the pipeline, two. Signal EQ2 is activated and sent to the decode stage (step 56) when test 50 detects that the pre-decremented counter is equal to two. The current iteration in the decode stage is not dispatched, step 58. The subsequent LT2 signals that are generated are ignored, step 62, and finally the instruction following the repeat string move is decoded and dispatched, step 64.

When the counter variable is greater than two, both tests 50, 52 fail and no signals are sent to the decode stage, which continues to dispatch iterations. When the counter variable, before decrement, is less than two, test 52 causes the LT2 signal to be sent to the decode stage, step 54. A pipeline flush 60 occurs once the current iteration reaches the final stage, flushing any other iterations in the pipeline. The instruction following the repeat string move is then decoded and dispatched, step 64, ending processing of the repeat move string instruction.

Examples of Repeat String Instructions

FIG. 6 is an example of a pipeline processing a repeat string move instruction with an initial counter variable of two or more. Once the third flow of the second-to-the-last iteration, MOVS-A3, reaches the execute stage, the counter variable is two and EQ2 is signaled to the decode stage. The current iteration in the D stage is not dispatched, but the next iteration already dispatched, MOVS-B, is completed. The counter variable is decremented by MOVS-A3 from two to one, and then by MOVS-B3 from one to zero. Thus the final two iterations are completed. The initial number of iterations may be any practical value greater than two; eventually all iterations before MOVS-A are completed and the pipeline appears as shown in FIG. 6.

FIG. 7 is an example of a pipeline processing a repeat string move instruction with an initial counter variable of one. Once the third flow of the first iteration, MOVS-A3, reaches the execute stage, the counter variable is one, the initial value. Since the counter variable is less than two, LT2 is signaled to the decode stage. When the decode stage receives the LT2 signal, it signals a pipeline flush during the next clock cycle. The third flow of the first iteration, MOVS-A3, moves to the final write-back stage, but all other flows in stages D, A, C, M are invalidated. Thus the second iteration, MOVS-B, is invalidated by the pipeline flush. MOVS-B should not be processed since only one iteration is called for when the counter variable is one. The counter variable is decremented by MOVS-A3 from one to zero, indicating the end of processing the repeat string instruction.

FIG. 8 highlights a pipeline processing a repeat string move instruction with an initial counter variable of zero. Occasionally a non-optimized compiler sets up a repeat string instruction which has an initial counter variable of zero. As the first flow of the first iteration, MOVS-A1, reaches the execute stage, the counter variable is zero, the initial value. Since the counter variable is zero, LT2 is signaled to the decode stage. When the decode stage receives the LT2 signal, it signals a pipeline flush during the next clock cycle. The first flow of the first iteration, MOVS-A1, moves to the final write-back stage, but all other flows in stages D, A, C, M are invalidated. This includes the second and third flows of the first iteration, MOVS-A2, MOVS-A3, and the first flow of the second iteration, MOVS-B1. The remaining flows of the first iteration should not be processed since no iterations are called for when the counter variable is zero.

Decode LT2 Blocking Logic—FIG. 9

FIG. 9 is a diagram of logic in the decode stage which blocks the next LT2 signal which follows the EQ2 signal. The next LT2 signal following the EQ2 signal is ignored by step 66 of FIG. 5. Step 66 may be implemented by the logic of FIG. 9. Signal EQ2 28 is received from the execute stage and is latched in by latch 80 on each edge of the processor clock PCLK which clocks the pipeline. Latch 80 is reset or cleared at the beginning of each new instruction by signal NEW-INSTR. The complement of the output of latch 80 is input to AND gate 82, which gates signal LT2 26 from the execute stage. Signal LT2 is connected to the other input of AND gate 82, whose output is LT2-DEC signal 84, the gated LT2 signal to the decode stage.

The LT2 signal from the execution stage is blocked by AND gate 82 after the EQ2 signal is received. Thus as the counter variable is decremented, signal EQ2 is always signaled before LT2 when the initial counter variable is greater than or equal to two. The circuit of FIG. 9 effectively ignores LT2 once the EQ2 signal is received.

Conditional Repeat String Instructions

Some repeat string instructions are terminated when a flag is set. For example, a string compare instruction compares a character to a register value and sets a flag in the flags register when a match is found. The third iteration then performs a test on the flag and exits the string instruction if the flag is set, indicating a match. The flag test performed by the third iteration simply asserts the LT2 signal from the execution stage to the decode stage to have the pipeline flushed. Thus these non-deterministic string instructions may be processed in a similar manner to short deterministic string instructions.

ADVANTAGES OF THE INVENTION

The invention processes repeat string instruction with a minimum of additional hardware, reducing cost and complexity. Only two extra signal lines are needed between the execution stage and the dispatch and decode stage. Two or more copies of the counter variable do not need to be stored as the decode stage does not need to read the counter variable directly. A dedicated decrementer is not needed. The decode stage also does not need extra compare logic since the comparison is performed in the execute stage where compare logic is already present for executing arithmetic and logical instructions. The pipeline flush logic used for exception an interrupt processing is used for ensuring correct execution of repeat string instructions.

Most string instructions require two or more iterations, and the invention does not require a pipeline flush for these instructions. Only the rare repeat string instruction requiring one or zero iterations results in a pipeline flush. Since one or zero iterations do not need to use the repeat type of instruction in the first place, often these are abnormal results of inefficient compilers.

ALTERNATE EMBODIMENTS

Several other embodiments are contemplated by the inventor. For example many pipeline arrangements are possible, and the invention may be adapted for use in super-scalar processors having multiple pipelines. Many implementations of the logic described herein are possible. The exact timing of the various signals may be varied as is common in pipelined processors. The counter variable may be updated at a somewhat different point in time and in the pipeline.

Longer pipelines may contain additional iterations and comparator 12 of FIG. 2 is then modified to compare to the larger maximum number of iterations in the active pipeline after the dispatching stage. Iteration tracker logic in the decode stage may be added to determine the number of iterations in the pipeline instead of simply flushing the pipeline when LT2 is signaled.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A pipelined processor for processing a repeated string instruction, the pipelined processor comprising:

a plurality of pipeline stages for processing instructions, the plurality of pipeline stages receiving decoded instructions from a decode stage for dispatching pipeline flows into the pipeline stages;

the plurality of pipeline stages having a pipeline capacity, the pipeline capacity being a maximum number of iterations of a repeated string instruction capable of being present in the plurality of pipeline stages;

a register file containing general-purpose registers, wherein a register in the general purpose registers is designated as an iteration counter for indicating a remaining number of iterations to perform for the repeated string instruction;

compare means, in the plurality of pipeline stages, for comparing the iteration counter to the pipeline capacity and activating a halt signal to the decode stage when the iteration counter has a value equal to the pipeline capacity; and iteration means, in the decode stage receiving the halt signal from the compare means, for halting dispatching of iterations of the repeated string instruction and for dispatching a following instruction after the repeated string instruction in response to the halt signal but continuing to dispatch iterations of the repeated string instruction when the halt signal is not received, whereby dispatching of iterations of the repeated string instruction is halted when the iteration counter is equal to the pipeline capacity of iterations.

2. The pipelined processor of claim 1 further comprising:

decrement means in the plurality of pipeline stages for adjusting the value of the iteration counter as an iteration is processed.

3. The pipelined processor of claim 2 wherein the following instruction after the repeated string instruction is dispatched by the decode stage before the iteration counter reaches zero, whereby processing of the following instruction begins while the repeated string instruction is being processed.

4. The pipelined processor of claim 3 further comprising:

second compare means, in the plurality of pipeline stages, for comparing the iteration counter to the pipeline capacity and activating a flush-request signal when the iteration counter has a value less than the pipeline capacity;

flush means, receiving the flush-request signal, for halting dispatching of additional iterations and invalidating pipeline stages in response to the flush-request signal; and blocking means, coupled to the flush-request signal, for preventing activation of the flush-request signal after the halt signal has been generated, whereby a pipeline flush occurs when the iteration counter has a value less than the pipeline capacity before the halt signal is activated.

5. The pipelined processor of claim 4 wherein the flush-request signal is activated for short strings requiring fewer iterations than the pipeline capacity.

6. The pipelined processor of claim 4 further comprising:

initial compare means, for comparing the iteration counter to zero and activating the flush-request signal when the iteration counter is zero for a first iteration of the repeated string instruction, whereby a pipeline flush occurs when zero iterations are initially indicated by the iteration counter.

7. The pipelined processor of claim 4 wherein the first compare means and the second compare means are both the general-purpose arithmetic-logic-unit (ALU) in an execute stage in the pipeline stages.

8. The pipelined processor of claim 4 further comprising:

multi-flow means, in the decode stage, for dispatching multiple flows through the plurality of pipeline stages on successive clock cycles, wherein the multiple flows comprise an iteration, whereby multiple flows are dispatched for the iteration.

9. The pipelined processor of claim 8 wherein a flow in the multiple flows in the iteration comprises a load or a store operation of a character in a string in memory when the repeated string instruction is a repeated move-string instruction.

10. The pipelined processor of claim 9 wherein the repeated move-string instruction is a REP MOVS instruction in an x86 instruction set.

11. The pipelined processor of claim 10 wherein the iteration counter is an ecx register of an x86 instruction set.

12. The pipelined processor of claim 8 wherein a flow in the multiple flows in the iteration comprises a compare operation which sets a flag in the register file when a character in a string matches a search character when the repeated string instruction is a repeated string-compare instruction.

13. The pipelined processor of claim 12 further comprising:

flag test means, in the plurality of pipeline stages, for activating the flush-request signal when the flag matches a pre-determined state indicating that a character match occurred during the compare operation, whereby a pipeline flush occurs when the flag indicates the character match occurred.

* * * * *